3,076,839
Patented Feb. 5, 1963

3,076,839
PROCESS FOR PRODUCING ALLYLIC ESTERS
Robert L. Webb, Jacksonville, Fla., assignor to The Glidden Company, Cleveland, Ohio, a corporation of Ohio
No Drawing. Filed Sept. 15, 1958, Ser. No. 760,844
21 Claims. (Cl. 260—489)

This invention is concerned with a process for converting organic allylic halides derived from terpenes to the corresponding allylic acyloxy compounds by treatment of the chlorides with salts of carboxylic acids. It is more particularly concerned with improvements in the conversion of allylic terpenic chlorides to the corresponding esters by treating them with salts of carboxylic acids in the presence of catalytic quantities of cuprous compounds.

Terpenic allylic halides can be produced in several ways such as:

(A) Addition of hydrogen chloride to the conjugate system of a terpene. Myrcene thus yields linalyl and geranyl chloride when treated with one mole of hydrogen chloride and further treatment with a second mole of HCl yields 2-chloro-dihydro linalyl and 2-chloro-dihydrogeranyl chlorides. Alloocimene also yields allylic chlorides on treatment with hydrogen chloride as do α-terpinene, phellandrenes, the pyronenes and para menthadiene-2,4(8). Also dehydroterpenes containing a conjugate system of double bonds such as verbenene, dehydrophellandrenes, and dehydromyrcene readily add hydrogen chloride (bromide) to yield allylic terpenic chlorides (bromides).

(B) Terpenes can be chlorinated to produce allylic chlorides. Thus, α-pinene yields pinocarvyl chloride, limonene yields carvyl chloride, carvomenthene yields carvotanacetyl chloride, myrcene yields 3-chloro-2-methyl-6-methylene-1,7-octadiene, 3-menthene yields 5-chloro-3-menthene. Alloocimene yields an allylic chloride, 3-chloro-2,6-dimethyl-1,4,6-octatriene. Dihydro and tetrahydro myrcene and alloocimene likewise yield allylic chlorides as do α-terpinene, gamma-terpinene, terpinolene and the pyronenes and dihydro pyronenes, and other cyclohexadienes resulting from cyclization of alloocimene. Bromides are analogously produced through brominations of the hydrocarbons. In general, any terpene, dihydro or tetrahydro-terpene, containing one or more double bonds can be chlorinated or brominated to produce allylic terpenic halides.

Also, terpenic compounds containing more than one allylic group can be produced by introduction of more than one halogen atom into the molecule. Thus, if 2,6-dimethyl-2,6-octadiene is chlorinated at 25–35° C. and in the presence of sodium bicarbonate in excess over that required to neutralize the hydrogen chloride produced, a mixture of dichlorides is produced which are almost entirely diallylic, that is, there is little vicinal dichloride present. Such allylic dichlorides are suited for conversion to allylic terpenic diol esters according to the methods of the present invention.

Allylic terpenic chlorides can, of course, also be prepared by treatments of substituted terpenic hydrocarbons. Thus alpha terpineol, which may be considered 8-hydroxy-carvo-menthene, halogenates to 8-hydroxy-carvotanacetyl chloride, and alpha terpinyl chloride chlorinates to form 8-chloro-carvotanacetyl chloride. The allylic terpenic chloride can contain two allylic groups such as the product resulting from chlorination of geranyl chloride or geraniol.

Allylic terpenic halides are therefore readily available from a wide choice of terpene and hydroterpene raw materials. These allylic halides are valuable intermediates for producing allylic esters and alcohols of the terpenic class and such esters and alcohols find use as valuable perfumery ingredients and for flavor. Thus, the allylic terpenic chlorides mentioned above will yield, when treated with salts of carboxylic acids, esters of terpene alcohols which are valuable per se and/or as the free alcohols produced on saponification. Myrcene hydrohalides are the source of geraniol and linalool while compounds of the spearmint series can be obtained from carvyl chloride and compounds of the peppermint series from 5-chloro-3-p-menthene.

Unfortunately, although allylic terpenic chlorides are relatively reactive compared with non-allylic terpenic chlorides, their conversion to the corresponding esters by heating them with salts of carboxylic acids according to prior art procedures leaves much to be desired. The reactions to form esters are relatively slow and yields are poor. Many of the allylic chlorides are relatively unstable thus leading to dehydrohalogenation during treatment according to the prior art. Attempts to speed up the reaction between the halide and the salt of the carboxylic acid by heating intensifies the problem of dehydrohalogenation. Further, linalyl/geranyl/neryl chlorides tend to cyclize readily to terpinyl chloride. Further, linalyl/geranyl/neryl esters are not very stable and tend to cyclize and split out the carboxylic acid under the vigorous reaction conditions which must be applied using prior art methods to force the allylic chloride to react completely with the carboxylic acid salt in a reasonable length of time. Accordingly, the primary object of this invention is to produce terpenic esters and alcohols, and particularly allylic terpenic esters and alcohols.

An additional object of this invention is to provide an improved method for reacting allylic terpenic halides with salts of carboxylic acids to produce allylic terpenic esters.

Another object is to provide catalysts for reacting allylic terpenic halides with salts of carboxylic acids.

An important object of this invention is to provide a method for obtaining increased yields of allylic terpenic esters and alcohols.

Another important object of this invention is to provide a process for converting the cheap and readily available terpenic compounds produced by the domestic naval stores industry into esters and alcohols valuable, per se or as intermediates, in perfumery and flavor applications.

The process of my invention comprises a method for preparing allylic terpenic carboxylic esters whereby there are brought together an allylic terpenic halide, a cuprous halide catalyst and a substance capable of furnishing carboxylate ions and in the presence of a substance capable of neutralizing hydrogen halide and removing halide ions from solution. The problems involved in accomplishing the objects of this invention and suitable solutions to these problems are described in the body of this specification and in the examples.

In conducting the process of my invention in its simplest form an allylic terpenic halide is treated with a salt of a carboxylic acid in the presence of a cuprous compound which acts as a catalyst for the formation of the allylic terpenic ester. Example 1 shows a typical procedure for conversion of a myrcene hydrochloride (rich in geranyl chloride) whereby the allylic chloride is treated with sodium acetate in excess of that required by theory to convert the chloride to the acetate. Acetic acid is present as a solvent and a catalytic quantity of cuprous chloride is also present. The reaction proceeds to completion in a few hours stirring at ambient temperatures. The yield of esters (largely linalyl) is practically quantitative based on the geranyl/linalyl chloride present in the crude myrcene hydrochloride. The non-allylic chloride produced during the hydrochlorination is not affected by the treatment. As shown in Example 3, the non-allylic terpinyl chloride does not yield terpinyl acetate under the influence of the catalyst.

Example 2 shows how slowly the reaction of myrcene hydrochloride with sodium acetate proceeds in the absence of the cuprous chloride catalyst and the great effect upon the addition of cuprous chloride.

A principle involved in the present invention is illustrated by Example 35 wherein it is shown that myrcene hydrochloride is solvolyzed in acetic acid solution in the presence of cuprous chloride to provide what is apparently an equilibrium of allylic chloride, acetic acid, ester and hydrogen chloride. As the free hydrogen chloride is neutralized and chloride ion removed by precipitation of sodium chloride through successive additions of a base (sodium acetate), the equilibrium shifts until the allylic halide is completely reacted upon addition of enough sodium acetate. It is evident that any base capable of neutralizing the hydrogen chloride and removing the chloride ion from solution, as by precipitation, would also be effective in shifting the equilibrium toward the ester. It is convenient and economical, however, to employ a sodium, potassium, ammonium or amine salt of the carboxylic acid, however, as this reagent provides both the carboxylate ion and the necessary neutralizing function.

Other examples show preparation of various types of allylic terpenic halides and their reaction with various salts of carboxylic acids. The reactions are invariably substantially improved with respect to rate of reaction and yields when conducted in presence of cuprous chloride or bromide catalysts.

Since a wide variety of allylic halides are available and a wide choice of bases and carboxylate ions is possible, it will be appreciated that no one set of optimum operating conditions to produce esters can be formulated. Various modified procedures are illustrated in the examples to provide high yields of allylic terpenic esters irrespective of the various problems introduced by use of such widely differing allylic halides as geranyl (a term I use to include neryl) and say carvyl halide or by such widely differing salts as represented by formate and fumarates, etc. As will be shown the nature of the salt with respect to the base used in preparing it is also to be taken into account in choosing best reaction conditions.

In general I prefer to conduct the cuprous catalyzed reaction of the allylic halide with carboxylate ions in a solvent medium for the latter. This medium is ordinarily suitably provided for by the presence of free carboxylic acid corresponding to the carboxylic ester desired and to the salt chosen for neutralization of the hydrogen chloride liberated and for removal of the chloride ion through formation of an insoluble chloride salt. I thus can choose to operate in the presence of say 10% or more of the free carboxylic acid if it is liquid or readily soluble in the reaction mixture and if the salt present is an inorganic metal salt. However, in the case of ammonium or amine salts of carboxylic acids, these provide suitable ionization media and available carboxylate ions without presence of free acidity. The important consideration is to provide readily available carboxylate ions which can be accomplished either by use of a solvent such as a carboxylic acid or by a liquid or readily fusible ammonium or amine salt. The examples show also special solutions to this problem when the carboxylic acid is insoluble in the reaction mixture. Also, it will be appreciated that crude allylic halides may contain free hydrohalogen acid or may decompose to produce free hydrohalogen acid under the chosen reaction conditions, and this free mineral acidity will produce free carboxylic acid in the reaction medium through reaction with a neutral carboxylic acid salt.

The desired conversion reactions occur at temperatures well below room temperature though they are accelerated by heating. The chief temperature limitations which are of concern are those with respect to decomposition rates of the allylic halide and the allylic ester under the specific reaction conditions. Thus, as shown in the table of Example 18, crude geranyl/neryl/linalyl chloride gives a good yield (57%) of formate ester at 10° C. when treated with formic acid/sodium formate in the presence of cuprous chloride. A poorer yield is obtained at 25–30° C. (47%). Also it will be noted that the undesirable cyclization product, terpineol, is present to much greater extent in the reaction product obtained at 25–30° C. thus decreasing the yield of the desired allylic compounds, linalool/geraniol and nerol. The desirability of specific conditions must be judged not only in terms of total ester produced but also in terms of the ratio of desirable allylic esters (or alcohols) to undesirable terpinyl ester (or alcohol). The ester is best analyzed by saponification, then subjecting the crude saponification mixture to vapor phase chromatographic analysis. Saponification does not change the ratio of allylic terpenic compounds from what their ratio was in the ester form. If this formic acid/formate reaction had been run at higher temperature, say 60° C., little valuable allylic alcohols would have resulted and the reaction product would have consisted largely of hydrocarbons, polymer, terpinyl formate, etc., since linalyl formate in the presence of formic acid tends to cyclize, split out formic acid and polymerize readily at elevated temperatures. Use of lower temperatures, minimum free formic acid (i.e., a more highly buffered system) and shorter reaction times consistent with the reaction rate and degree of reaction desired would tend toward optimum yields.

On the other hand, as shown in the table of Example 16 where acetic acid/sodium acetate is employed good yields of the desired allylic compounds are shown to be obtained over the range 25 to 70° C. since the allylic acetates in the presence of acetic acid are much more stable than are the allylic formates in presence of the much stronger formic acid at elevated temperatures. Obviously there exists a compromise for time/temperature since temperature increase will increase all the reaction rates involved, both of conversion of allylic halide to ester and cyclization or other undesirable decomposition of ester. Higher temperatures therefore can be used if shorter reaction times are used. This is shown further in Example 34 where a five minute reaction at 90–95° C. gave much better yields of gerany/neryl/linalyl acetates and less of the less valuable terpinyl acetate than did a fifteen minute reaction. The geranyl/linalyl halides and their esters are among the most sensitive of the terpenic compounds herein described to undesired isomerizations, cyclizations and polymer formations induced by high temperatures, high acid concentrations and strong carboxylic acids. Therefore, insofar as myrcene hydrohalides are concerned e.g. linalyl (geranyl) neryl chloride, I prefer to conduct these reactions at temperatures of below about 100° C. since at such temperature optimum results are realized under the conditions of my invention. Other allylic systems, notably the allylic cyclic terpenic halides can be treated according to the process of this invention at temperatures above 100° C. even though excellent results are obtained by employing temperatures below 100° C. Thus, the allylic systems herein described such as carvyl halide/carvyl ester or 5-chloro-3-menthene/5-acyloxy-3-menthene are much less subject to undesirable decompositions and if desired, high temperatures can be used in producing these esters in presence of cuprous chloride. Thus, for example, these systems can be operated quite satisfactorily at say 150° C. or higher and using shorter times of reaction than if say 120° C. were employed as reaction temperature. Further, the carvyl halide/acetate system is simpler in that only carveol (cis and trans) is produced as compared to the geranyl halide/acetate system where a chief product is the isomeric linalyl acetate and where side reactions such as cyclizations, polymerizations, etc., are to be dealt with.

As catalyst we prefer to employ cuprous chloride as it is cheap and easily available. Cuprous iodide or bromide are also effective, but are more expensive and offer no advantage over the chloride. Cupric chloride is not effective as a catalyst.

As equivalents to cuprous chloride, we may use cuprous oxide or copper or mixtures of copper and cupric compound. These are equivalent to cuprous chloride to the extent the latter is produced in situ in the reaction mixture. Only traces of cuprous compound are necessary to promote solvolysis of the allylic halides in an ionizing medium and the hydrogen chloride produced or already present in the crude allylic halide can react with cuprous oxide, powdered copper or the like to produce cuprous chloride in sufficient quantities to act as effective catalyst. It is evident that sufficient cuprous chloride can be produced from corrosion of a copper or copper bearing vessel to cause the catalysis herein described. However, in general, since cuprous chloride is cheap and commercially available, we prefer to add it to the reaction mixture directly to insure its presence in adequate quantity for economic reaction rates. Although only say 0.01% or less cuprous chloride is effective in producing the catalytic phenomenon involved, we prefer to use, say 0.2 to 5.0% catalyst based on weight of allylic halide processed. Larger quantities of catalyst can be used, but are not necessary.

With respect to the organic acid moiety any organic carboxylic acid or salt or combination of these can be employed. Certain organic acids or carboxylate groups offer special problems requiring modification of reaction conditions. However, if lower fatty acid esters are desired, it is necessary only to mix the allylic halide with cuprous chloride, the lower fatty acid and its salt. Reaction takes place readily and additional solvent is required only if the mixture is of such consistency that agitation would be facilitated by presence of more liquid. In such a case any paraffinic, aromatic or unreactive (saturated or aromatic) halide will suffice. If geranyl/linalyl/neryl ester is to be produced, I usually prefer to employ the acetate since the acetate is readily produced and isolated from the crude ester mixture and the acetates are useful in largest volume in perfumery. However, the named esters of the other lower fatty acids are also valuable for the same use and are also readily produced without difficulty. If linalool/geraniol/nerol are to be produced, the acetate is also a good choice since acetic acid and its salts are cheap and are readily recovered for reuse from the aqueous saponification liquors. Of course, any acid and its salt can be used if the alcohols are to be the end products desired since any of the esters of the carboxylic acids are readily saponified. The choice is made simply on the basis of the over-all economics which obtain, though as stated, sodium acetate-acetic acid is a good and satisfactory combination. Mixed carboxylic acids could, of course, be used to produce mixed esters. The organic acid, say acetic acid, and the neutralizing agent, say sodium acetate and the catalyst and allylic halide may be added in any order. If desired, the carboxylic acid may be mixed with the halide and catalyst and the base, say tri-sodium phosphate or ammonia or amine can be added over a period of time to cause the solvolysis to go to completion through neutralizing the hydrochloric acid and removing chloride ion from the ionic system through precipitation as the sodium salt. A like result can be obtained using an anion exchange resin (Example 22). The ammonium salts of the lower fatty acids alone in the presence of cuprous chloride yield good results when treated with allylic halides.

It is shown in Example 18 that certain mixtures of acids with their sodium and potassium salts do not give good yields of allylic esters although in every case, cuprous chloride exhibited its strong catalytic effect and improved the ester yield. The reaction products are instead rich in terpinyl chloride, the cyclization product.

It may be assumed that the acid/salt system involved in each case does not make available to the reaction the proper amounts of carboxylate ions plus base for neutralization and that the reason for the relatively poor results is lack of solubility of the carboxylic salt, i.e., the corresponding carboxylic acid in this case is not a good mutual solvent for the particular salt and the allylic halide. This difficulty in formation of tartrates, fumarates, oxalates, etc., is readily overcome as shown in Example 21 by employing the triethylamine salts of such acids which are more soluble and insure the presence of dissolved base and carboxylate ions in the reacting system. I have found in general that many amine salts tend to be more soluble in the reaction compositions with which I am concerned than many metal salts and can be used to produce good yields of esters of otherwise difficultly reactive acids. Other amines which are useful in this connection include cyclohexylamine, di-amylamine, butanol amine, stearyl amine and the like. Other additional salts can also be used if desired, such as the quaternary ammonium salts, amidine salts, thiouronium salts, etc.

It is shown in Example 17 and is discussed in Example 19 that certain metals are not satisfactory in neutralizing the hydrogen chloride and removing chloride ion from the reacting system. These metals form chlorides which are sufficiently soluble in the reaction system that they prevent the reaction from going to completion to form good yields of esters. In Example 19, it is shown that if proper solvent combinations are employed, this difficulty may be overcome. Thus, when calcium chloride is the salt produced, the incorporation of benzene as a solvent in the reaction mixture tends to reduce the solubility of calcium chloride in the reaction oil and addition of water to cause formation of a second phase in which calcium chloride is very soluble, suffices to fulfill the conditions required for giving good yields of ester. It is also shown that if lithium chloride is too soluble in the reaction mixture so that good yields of ester are not produced, that acetone may be incorporated in the reaction mixture to reduce the solubility of the inorganic chloride in the solution to the point that the chloride is precipitated and much more ester is produced.

It will be appreciated that although I can employ any carboxylic acid and the ammonium or any metal or amine salt thereof, or even an ion exchange resin, I will prefer to employ the most economical reagents for providing carboxylate ions and precipitation of halide consistent with my objective in conducting the process. Ordinarily acetic acid as solvolysis medium and solvent for the sodium acetate to be used as a base will be vary economical and satisfactory as long as I wish to produce allylic alcohols since the acetates are readily converted to the alcohols or the acetates are useful themselves. However, the means are available for producing any other esters that may be desired. An example of the utility of esters other than the lower fatty acid esters is the acid phthalate of 3-menthene-5-ol which is a crystalline substance readily purified by recrystallization and then saponifiable to high purity 3-menthene-5-ol suitable for hydrogenation and further processing to menthol. Other crystalline esters such as the fumarates, terephthalates, etc., can be prepared. Where acid esters are produced they can be readily separated from crude reaction products by virtue of the solubility of their alkali metal, amine or ammonium salts in water.

Water can be present in the reaction systems described herein but we usually prefer to operate in its absence except for that small amount of water which may be present in the reagents employed. Thus, a few percent water may be present in commercial "anhydrous" sodium acetate or in say commercial acetic and formic acids. These quantities of water are not objectionable. Larger quantities of water can be tolerated but some hydrolysis can then take place and the ester product will then contain some allylic alcohols.

It is to be noted that throughout this specification the acyclic terpenes and derivatives are named for consistency as derivatives of 2,6-dimethyl octane.

The following examples illustrate my invention.

EXAMPLE 1

Five hundred (500) grams of myrcene hydrochloride prepared by adding 1 mole of anhydrous HCl to myrcene (95+%) in the presence of 0.5% cuprous chloride at 10–20° C., 500 grams of acetic acid, 267 grams of anhydrous sodium acetate and 20 grams of cuprous chloride were stirred at 25–30° C. for five hours. The reaction mixture was washed with water, followed by a 10% sodium bicarbonate wash to yield 510 grams of crude acetate. Fractionation of the crude acetate through an efficient column at 1–2 mm. of mercury followed by infrared spectroanalysis of the fractions indicated that the crude acetate was 3–5% hydrocarbons, 8–10% alpha-terpinyl chloride, 75–80% linalyl acetate, 5–10% geranyl acetate+neryl acetate and a trace of dichlorides.

EXAMPLE 2

Five hundred (500) grams of myrcene hydrochloride prepared as in Example 1 (2–4% unchanged myrcene, 5–10% linalyl chloride, 10–12% alpha-terpinyl chloride, 75–80% geranyl chloride and 1–2% dichlorides) was washed with cold water and filtered to remove the cuprous chloride. The washed hydrochloride, 500 grams of acetic acid, 267 grams of anhydrous sodium acetate were stirred at 20–25° C. for 40 hours at which time a sample was taken and analyzed for ester and unreacted hydrochlorides. The analysis showed that the product contained 25–30% ester and 70–75% unreacted hydrochlorides. The addition of 20 grams of cuprous chloride at this point raised the ester content to 85–90% in an additional 4 hours. The reaction mixture was washed, fractionated and the fractions analyzed by infrared spectroanalysis. The analysis showed that the reaction product was essentially the same as the reaction product from Example 1, that is, 75–80% linalyl acetate, 5–10% geranyl acetate+neryl acetate, 3–5% hydrocarbons and 8–10% alpha terpinyl chloride.

EXAMPLE 3

Five hundred (500) grams of alpha-terpinyl chloride, prepared by hydrochlorinating limonene at 15–25° C., 500 grams of acetic acid, 267 grams of anhydrous sodium acetate and 50 grams of cuprous chloride were stirred at 25–30° C. for 40 hours. The reaction mixture was washed with water, followed by a sodium bicarbonate wash to yield 495 grams of oil. Infrared spectroanalysis of the oil indicated that it was unchanged alpha-terpinyl chloride. This example shows that a non-allylic terpene halide is not applicable to the process of this invention.

EXAMPLE 4

Six hundred and thirty grams (630) of myrcene hydrobromide prepared by hydrobrominating myrcene (95+%) containing 0.5% by weight of cuprous chloride at 15–20° C., (1–2% unchanged myrcene, 5–10% linalyl bromide, 10–15% alpha-terpinyl bromide, 75–78% geranyl bromide+neryl bromide), 500 grams of acetic acid, 267 grams of anhydrous sodium acetate and 20 grams of cuprous chloride were stirred at 25–30° C. for five hours. The reaction mixture was then washed with water, followed by a sodium bicarbonate wash to yield 515 grams of crude acetate. Fractionation of the crude acetate through an efficient column at 1–2 mm. of mercury followed by infrared spectroanalysis of the fractions indicated that the crude acetate was 2–4% hydrocarbons, 10–12% alpha terpinyl bromide, 75–80% linalyl acetate and 5–10% geranyl acetate+neryl acetate.

EXAMPLE 5 d-Limonene was chlorinated at 55–60° C. in the presence of 1.25 moles of sodium bicarbonate. The chlorination product was 5–10% alpha-terpinyl chloride, 80–85% carvyl chloride and 10–15% dichloride. Five hundred (500) grams of the chlorination product, 500 grams of acetic acid, 267 grams of anhydrous sodium acetate and 20 grams of cuprous bromide were stirred at 20–25° C. for five hours. The reaction mixture was washed with water, followed by a sodium carbonate wash to yield 508 grams of crude acetate. Fractionation of the crude acetate followed by infrared spectroanalysis of the fractions indicated that it was 3–5% hydrocarbons, 5–8% alpha- terpinyl chloride, 78–81% carvyl acetate (mixture of cis- and trans-forms) and 10–12% dichlorides.

EXAMPLE 6

One mole of chlorine was reacted with 3-p-menthene at 85–90° C. The chlorination product was 90–92% 5-chloro-para-menthene-3 and 8–10% 3,4-dichloro-para-menthane. Five hundred (500) grams of the chlorination product, 500 grams of acetic acid, 267 grams of anhydrous sodium acetate and 20 grams of cuprous chloride were stirred at 25–30° C. for six hours. Reaction mixture was washed with water followed by a 10% sodium bicarbonate wash to yield 513 grams of crude acetate. Fractionation of the crude acetate through an efficient column at 10 mm. of mercury followed by infrared spectroanalysis of the fractions indicated that the crude acetate was 5–10% hydrocarbons, 80–85% 3-para-menthenyl-5-acetate and 8–10% dichlorides (3,4-dichloro-para-methane).

EXAMPLE 7

One mole of chlorine was added to α-pinene at 20–25° C. in the presence of 1.25 moles of sodium bicarbonate. The chlorination product was 20–25% bornyl chloride, 65–70% pinocarvyl chloride and 10–15% dichlorides. Five hundred (500) grams of the chlorination mixture, 500 grams of acetic acid, 267 grams of sodium acetate and 20 grams of cuprous chloride were stirred at 25–30° C. for six hours. The reaction mixture was then washed with water, followed by a 10% sodium bicarbonate wash to yield 489 grams of crude acetate. Fractionation of the crude acetate at 1–2 mm. of mercury followed by infrared spectroanalysis of the fractions indicated that the crude acetate was 5–10% hydrocarbons, 20–25% bornyl chlorides, 60–65% pino-carvyl acetate+myrtenyl acetate and 10–15% higher boiling compounds (dichlodies+chloro-acetates).

EXAMPLE 8

One mole of HCl was added to alpha-terpinene at 20–25° C. Infrared spectroanalysis of the hydrochlorination product indicated that it was a mixture of 1-chloro-2-para-menthene and 4-chloro-2-para-menthene. Five hundred (500) grams of the hydrochlorination product, 500 grams of formic acid (90%) and 250 grams of sodium formate and 20 grams of cuprous chloride were stirred at 20–25° C. for six hours. The reaction product was washed with water, followed by a 10% sodium bicarbonate wash to yield 473 grams of crude formates. Fractionation of the crude formates at 1–2 mm. of mercury followed by infrared spectroanalysis of the fractions indicated that the crude ester was 15–20% hydrocarbons plus traces of chlorides, 10–15% 2-para-menthenyl-1-formate, 40–45% 1-para-menthenyl-3-formate (piperityl formates, mixture of cis- and trans-) and 20–25% 2-para-menthenyl-4-formate (carvenyl formate).

EXAMPLE 9

One hundred (100) grams of myrcene hydrochloride (prepared as in Example 1), 30 grams of sodium carbonate, 165 grams of lactic acid and 4 grams of cuprous chloride were stirred at 25–30° C. for six hours. The reaction mixture was washed with a 10% sodium carbonate solution to remove the lactic acid. One hundred and fifteen (115) grams of crude ester was obtained. Infrared spectroanalysis of the crude ester indicated that it was 70–75% linalyl lactate.

EXAMPLE 10

Five hundred grams of myrcene hydrochloride (prepared as in Example 1), 267 grams of anhydrous sodium acetate and 20 grams of cuprous chloride were stirred at 50° C. for 24 hours. Infrared spectroanalysis of a washed sample indicated that the reaction product was unchanged myrcene hydrochloride containing 25–30% linalyl acetate. The addition of 500 grams of acetic acid to the reaction mixture and stirring for an additional 4 hours at 25–30° C. gave on washing a product which contained 70–75% linalyl acetate+a trace of geranyl and neryl acetate.

EXAMPLE 11

One hundred grams of myrcene hydrochloride (prepared as in Example 1), 200 grams of dioxane, 184 grams of benzoic acid, 30 grams of sodium carbonate and 2 grams of cuprous chloride were mixed at 25–30° C. for six hours. The reaction mixture was washed with water, followed by sodium carbonate washes and the oil recovered and saponified with a 20% KOH in methanol solution to yield 78 grams of saponified oil. The saponified oil was 70–75% linalool and 3–5% nerol+geraniol as determined by infrared spectroanalysis.

EXAMPLE 12

One mole of chlorine was added to myrcene (95+%) at 15–25° C. in the presence of 1.25 moles of sodium bicarbonate. Infrared spectroanalysis of the chlorination product indicated that it was 85–90% 3-chloro-2-methyl-6-methylene-1,7-octadiene, 10–15% dichlorides and traces of unreacted myrcene.

Five hundred (500) grams of the chlorination product, 250 grams of acetic acid, 275 grams of anhydrous sodium acetate and 20 grams of cuprous chloride were stirred at 25–30° C. for 8 hours. The reaction product was washed as before with water and a 10% sodium bicarbonate solution to yield 508 grams of crude acetate. Infrared spectroanalysis of the crude acetate indicated that it was 55–60% 2-methyl-6-methylene-1,7-octadiene-3-acetate and 20–25% 2-methyl-6-methylene-2,7-octadiene-1-acetate.

that it contained 45–50% linalyl acetate, 3–5% geranyl acetate and 15–18% unchanged geranyl chloride plus linalyl chloride.

EXAMPLE 14

Five hundred grams of myrcene hydrochloride (prepared as shown in Example 1), 500 grams of acetic acid, 267 grams of anhydrous sodium acetate, 20 grams of cuprous bromide were stirred at 25–30° C. for six hours. The reaction mixture was then washed with water, followed by a 10% sodium bicarbonate wash to yield 511 grams of crude acetate. Infrared spectroanalysis of the crude acetate indicated that it contained 70–75% linalyl acetate, 5–10% geranyl acetate plus neryl acetate, as well as a small amount of hydrocarbons, and 10–15% α-terpinyl chloride.

EXAMPLE 15

Five hundred grams (500) of myrcene hydrochloride (prepared as in Example 1), 150 grams of acetic acid, 320 grams of anhydrous potassium acetate and 20 grams of cuprous chloride were stirred at 25–30° C. for 10 hours. The reaction product was then washed with water followed by a 10% sodium bicarbonate wash to yield 508 grams of crude acetate. Infrared spectroanalysis of the crude acetate indicated that it contained 3–5% hydrocarbons, 5–10% geranyl chloride plus linalyl chloride, 10–12% α-terpinyl chloride, 70–75% linalyl acetate and 5–10% geranyl acetate plus neryl acetate.

EXAMPLE 16

Beta pinene pyrolysate (75% myrcene) was reacted with anhydrous HCl at 0–10° C. in the presence of 0.5% Cu$_2$Cl$_2$ (based on the β-pinene pyrolysate weight. Thirty-two (32) grams of HCl was used for each 136 grams of β-pinene pyrolysate. The resulting hydrochloride was filtered and washed to remove the Cu$_2$Cl$_2$.

One hundred (100) gram portions of the washed hydrochloride, sixty (60) grams of anhydrous sodium acetate, varying amounts of acetic acid and various catalysts were stirred at various temperatures. The resulting crude ester was saponified and the saponified oils analyzed by vapor phase chromatography and infrared spectroanalysis.

The amount of acetic acid used, temperature and time of reaction, catalyst used and analysis of the reaction products are listed in the following table.

*Table I*

| Percent acid based on hydrochloride | Chloride ion acceptor | Temp., °C. | Percent catalyst based on hydrochloride | Reaction time | Percent ester | Composition of alcohols from saponified ester. | | | |
|---|---|---|---|---|---|---|---|---|---|
| | | | | | | Percent linalool | Percent nerol | Percent geraniol | Percent terpineol |
| 100% acetic acid | Sodium acetate | 25–30 | None | 8 hours | 9 | 37 | 8 | 13 | 42 |
| Do | do | 25–30 | 4 Cu$_2$Cl$_2$ | do | 65 | 85 | 4 | 5 | 7 |
| 50% acetic acid | do | 25–30 | 4 Cu$_2$Cl$_2$ | do | 65 | 91 | 1 | 2 | 3 |
| 10% acetic acid | do | 25–30 | 4 Cu$_2$Cl$_2$ | do | 17 | 83 | | 2 | 14 |
| Do | do | 50 | 4 Cu$_2$Cl$_2$ | do | 46 | 92 | Trace | Trace | 8 |
| 100% acetic acid | do | 50 | 4 Cu$_2$Cl$_2$ | 4 hours | 63 | 81 | 6 | 7 | 7 |
| Do | do | 70 | 4 Cu$_2$Cl$_2$ | 1 hour | 65 | 75 | 6 | 9 | 10 |
| Do | do | 70 | 4 Cu$_2$Cl$_2$ | 2 hours | 65 | 67 | 8 | 10 | 15 |
| Do | do | 70 | 4 Cu$_2$Cl$_2$ | 4 hours | 58 | 65 | 7 | 13 | 15 |
| Do | do | 25–30 | 4 Cu$_2$O | 8 hours | 59 | 87 | 3 | 5 | 5 |
| Do | do | 25–30 | 8 Cu | do | 49 | 83 | 3 | 5 | 9 |
| Do | do | 25–30 | 4 CuCl$_2$ | do | 5 | 50 | | | 50 |
| Do | do | 25–30 | 4 Cu$_2$I$_2$ | do | 23 | 72 | 1 | 4 | 23 |
| 10% acetic acid | do | 90–95 | 4 Cu$_2$Cl$_2$ | 15 minutes | 25 | 35 | 15 | 25 | 25 |

EXAMPLE 13

Five hundred (500) grams of myrcene hydrochloride (prepared as shown in Example 1), 267 grams of anhydrous scdium acetate, 500 grams of acetic anhydride and 20 grams of cuprous chloride were stirred at 25–30° C. for 8 hours. The reaction mixture was washed with water followed by 5% aqueous sodium hydroxide washed until the oil was free of acetic anhydride. Five hundred and three (503) grams of crude acetate was recovered. Infrared spectroanalysis of the crude acetate indicated

EXAMPLE 17

One hundred (100) gram portions of washed beta pinene pyrolysate hydrochloride, prepared as shown in Example 16, acetic acid and 0.72 moles of various acetic acid salts were reacted in the presence and absence of Cu$_2$Cl$_2$. The crude ester obtained was saponified and the saponified oil analyzed by infrared spectroanalysis and vapor phase chromatography. The reactants used, conditions and analysis of the products are listed in the following table.

*Table II*

| Percent acid based on hydrochloride | Chloride ion acceptor | Temp., °C. | Percent catalyst based on hydrochloride | Reaction time, hrs. | Percent ester | Composition of alcohols from saponified ester | | | |
|---|---|---|---|---|---|---|---|---|---|
| | | | | | | Percent linalool | Percent nerol | Percent geraniol | Percent terpineol |
| 100% acetic acid | Potassium acetate | 25-30 | None | 8 | 9 | 51 | | 8 | 41 |
| Do | do | 25-30 | 4 Cu$_2$Cl$_2$ | 8 | 45 | 79 | 6 | 7 | 8 |
| Do | Ammonium acetate | 25-30 | 4 Cu$_2$Cl$_2$ | 8 | 68 | 86 | 4 | 6 | 4 |
| Do | Triethylamine acetate | 25-30 | 4 Cu$_2$Cl$_2$ | 8 | 63 | 74 | 10 | 13 | 3 |
| None | do | 25-30 | 4 Cu$_2$Cl$_2$ | 8 | 46 | 78 | 6 | 6 | 10 |
| 100% acetic acid | Triethanolamine acetate | 25-30 | 4 Cu$_2$Cl$_2$ | 8 | 55 | 82 | 4 | 8 | 7 |
| Do | N,N-diethyl-cyclohexylamine acetate | 25-30 | 4 Cu$_2$Cl$_2$ | 8 | 53 | 67 | 12 | 15 | 6 |
| Do | Magnesium acetate | 25-30 | 4 Cu$_2$Cl$_2$ | 8 | 42 | 77 | | 6 | 18 |
| Do | Lead acetate | 25-30 | 4 Cu$_2$Cl$_2$ | 8 | 62 | 78 | 2 | 5 | 15 |
| Do | do | 25-30 | None | 8 | 6 | 40 | | 7 | 43 |
| Do | Cupric acetate | 25-30 | do | 8 | 8 | 16 | | 5 | 79 |
| Do | do | 25-30 | 4 Cu$_2$Cl$_2$ | 8 | 17 | 52 | | 2 | 46 |
| Do | Aluminum acetate | 25-30 | 4 Cu$_2$Cl$_2$ | 8 | 10 | 17 | | | 83 |
| Do | Lithium acetate | 25-30 | 4 Cu$_2$Cl$_2$ | 8 | 17 | 15 | 9 | 22 | 54 |
| Do | do | 25-30 | None | 8 | 6 | 5 | 5 | 10 | 80 |
| Do | Barium acetate | 25-30 | 4 Cu$_2$Cl$_2$ | 8 | 53 | 84 | 2 | 5 | 9 |
| Do | Calcium acetate | 25-30 | 4 Cu$_2$Cl$_2$ | 8 | 8 | 5 | | 5 | 90 |
| Do | Silver acetate | 25-30 | None | 8 | 10 | 48 | | 6 | 46 |
| Do | do | 25-30 | 4 Cu$_2$Cl$_2$ | 8 | 56 | 35 | 3 | 23 | 39 |

EXAMPLE 18

One hundred (100) gram portions of washed beta pinene pyrolysate hydrochloride prepared as shown in Example 16, various carboxylic acids and various carboxylic acid salts were reacted in the presence and absence of Cu$_2$Cl$_2$. The crude esters were saponified and the saponification products were analyzed by infrared spectroanalysis and vapor phase chromatography. The reactants used, reaction conditions and the analysis of the products are shown in the following table.

*Table III*

| Percent acid based on hydrochloride | Chloride ion acceptor | Temp., °C. | Percent catalyst based on hydrochloride | Reaction time, hours | Percent ester | Composition of alcohols from saponified ester | | | |
|---|---|---|---|---|---|---|---|---|---|
| | | | | | | Percent linalool | Percent nerol | Percent geraniol | Percent terpineol |
| 100% formic | Sodium formate | 25-30 | None | 8 | 15 | 15 | 15 | 20 | 50 |
| Do | do | 25-30 | 4 Cu$_2$Cl$_2$ | 8 | 47 | 44 | 2 | 12 | 42 |
| Do | do | 10 | 4 Cu$_2$Cl$_2$ | 8 | 57 | 63 | 3 | 6 | 28 |
| 100% chloracetic | Sodium chloro acetate | 25-30 | None | 8 | 8 | 10 | | 10 | 80 |
| Do | do | 25-30 | 4 Cu$_2$Cl$_2$ | 8 | 35 | 70 | | 10 | 20 |
| 100% fumaric [1] | Sodium fumarate | 25-30 | None | 8 | Trace | | | | |
| Do [1] | do | 25-30 | 4 Cu$_2$Cl$_2$ | 8 | [3] 14 | 76 | | | 24 |
| 100% furoic acid [1] | Sodium furoate | 25-30 | None | 8 | Trace | | | | |
| Do [1] | do | 25-30 | 4 Cu$_2$Cl$_2$ | 8 | [3] 13 | 77 | | | 23 |
| 100% sebacic | Sodium sebacate | 25-30 | 4 Cu$_2$Cl$_2$ | 8 | 51 | 65 | 2 | 3 | 30 |
| 100% propionic | Sodium propanoate | 25-30 | None | 8 | 10 | 25 | 4 | 7 | 64 |
| Do | do | 25-30 | 4 Cu$_2$Cl$_2$ | 8 | 64 | 89 | 3 | 4 | 4 |
| 100% isobutyric | Triethylamine isobutyrate | 25-30 | 4 Cu$_2$Cl$_2$ | 8 | 47 | 83 | 3 | 5 | 9 |
| 100% decanoic | Sodium decanoate | 25-30 | None | 8 | 10 | 40 | 7 | 13 | 40 |
| Do | do | 25-30 | 4 Cu$_2$Cl$_2$ | 8 | 48 | 87 | | | 13 |
| 100% phthalic [1] | Potassium acid phthalate | 25-30 | None | 8 | Trace | | | | |
| Do [1] | do | 25-30 | 4 Cu$_2$Cl$_2$ | 8 | [3] 15 | 89 | | | 11 |
| 100% tartaric [2] | Sodium tartrate | 25-30 | None | 8 | Trace | | | | |
| Do [2] | do | 25-30 | 4 Cu$_2$Cl$_2$ | 8 | [3] 10 | 67 | 1 | 3 | 29 |
| 100% citric [2] | Sodium citrate | 25-30 | None | 8 | Trace | | | | |
| Do [2] | do | 25-30 | 4 Cu$_2$Cl$_2$ | 8 | [3] 8 | 50 | | | 50 |
| 100% oxalic [2] | Sodium oxalate | 25-30 | None | 8 | Trace | | | | |
| Do [2] | do | 25-30 | 4 Cu$_2$Cl$_2$ | 8 | [3] 10 | 63 | | | 37 |
| 100% tall oil | Sodium tallate | 25-30 | None | 8 | 10 | 75 | 2 | 3 | 20 |
| Do | do | 25-30 | 4 Cu$_2$Cl$_2$ | 8 | 57 | 87 | 3 | 4 | 7 |
| 100% maleic | Sodium maleate | 25-30 | 4 Cu$_2$Cl$_2$ | 8 | [3] Trace | | | | |

[1] Reaction run in C$_6$H$_6$ (100% by weight based on hydrochloride).
[2] Reaction run in Dioxane (100% by weight based on hydrochloride).
[3] Reaction product was rich in d-terpinyl chloride.

EXAMPLE 19

The data of Example 17 shows that reactions carried out using sodium, potassium, ammonium, amine, lead, barium and silver salts of carboxylic acids, give substantial yields of ester. On the other hand, reactions using the cupric, aluminium, calcium and lithium salts give low yields of esters. The chlorides of cupric, aluminum, calcium and lithium are more soluble in organic acids than the chlorides of sodium, potassium, ammonium, amines, lead, barium and silver. If the reaction is carried out using metal salts of a carboxylic acid which when reacted will give a metal chloride, soluble in the reaction system, the chloride ion concentration of the reaction mixture is too high and the reaction will not go to completion. However, if the metal chloride formed during the reaction is insoluble in the reaction system, the chloride ions will be removed by precipitation and the reaction will proceed to give a high yield of ester.

The following experiments show that if the solubility of the metal chloride (produced during the reaction) is reduced, the reaction is forced toward ester formation.

One hundred (100) gram portions of beta pinene pyrolysate hydrochloride, prepared as shown in Example 16, 0.72 mole of the metal acetate, acetic acid and a solvent were reacted in the presence and absence of Cu$_2$Cl$_2$. The crude ester obtained was saponified and the saponified oil analyzed by infrared spectroanalysis and vapor phase chromatography. The reactants used, reaction conditions and analysis of the products are listed in the following table.

action products obtained using furoic, oxalic, citric, tartaric, phthalic, maleic and fumaric acids and their sodium or potassium salts have a low ester content. Separate analysis has shown that the reaction products also have

*Table IV*

| Percent acid based on hydrochloride | Chloride ion acceptor | Temp., °C. | Percent catalyst based on hydrochloride | Reaction time, hours | Solvent added based on hydrochloride | Percent ester | Composition of alcohols from saponified ester | | | |
|---|---|---|---|---|---|---|---|---|---|---|
| | | | | | | | Percent linalool | Percent nerol | Percent geraniol | Percent terpineol |
| 100% acetic acid | Calcium acetate | 25-30 | None | 8 | 100% water, 100% benzene | 10 | 5 | 2 | 5 | 88 |
| Do | do | 25-30 | 4 Cu$_2$Cl$_2$ | 8 | do | 52 | 81 | 1 | 2 | 16 |
| Do | Lithium acetate | 25-30 | None | 8 | 300% acetone | Trace | | | | |
| Do | do | 25-30 | 4 Cu$_2$Cl$_2$ | 8 | do | 20 | 65 | 4 | 9 | 22 |

EXAMPLE 20

Two reactions were carried out by stirring together 50 grams of linalyl acetate (98+%), 50 grams acetic acid, 7.5 grams calcium acetate, and 18 grams calcium chloride at 25-30° C. for 8 hours. To one of the reactions was added 2.5 grams of cuprous chloride at the beginning of the reaction. The reaction products were washed and the oil was analyzed by infrared spectroanalysis.

The analysis of the products showed that they had the following composition:

| | Percent linalyl acetate | Percent alpha terpinyl chloride | Percent neryl, geranyl plus linalyl chloride |
|---|---|---|---|
| No catalyst | 95 | Trace | Trace |
| Cu$_2$Cl$_2$ | 15 | 75 | 10 |

This pair of reactions shows that soluble chloride ions in presence of cuprous chloride are capable of converting linalyl acetate to linalyl chloride, geranyl and neryl chloride and alpha-terpinyl chloride.

EXAMPLE 21

From the data in Example 18, it can be seen that rea high terpinyl chloride content. The high terpinyl chloride content suggests that the sodium or potassium salts were not effective chloride ion acceptors (precipitators). This is probably due to their very low solubility in the reaction mixture.

The following experiments were carried out to show that the more soluble amine salts of these acids act more effectively as chloride ion acceptors and thus give higher yields of esters.

One hundred (100) gram portions of beta pinene pyrolysate hydrochloride, prepared as shown in Example 16, 1.15 moles of acid and 1.15 moles of triethylamine were stirred together with and without Cu$_2$Cl$_2$ present. The reaction products were saponified and the saponified oils were analyzed by infrared spectroanalysis and vapor phase chromatography. The reactants used, reaction conditions, and analysis of the products are shown in the following table.

*Table V*

| Amine salt | Temp., °C. | Percent catalyst based on hydrochloride | Reaction time, hours | Percent ester | Composition of alcohols from saponified ester | | | |
|---|---|---|---|---|---|---|---|---|
| | | | | | Percent linalool | Percent nerol | Percent geraniol | Percent terpineol |
| Mono Triethylamine oxalate | 25-30 | None | 8 | 5 | 40 | | | 60 |
| Do | 25-30 | 4 Cu$_2$Cl$_2$ | 8 | 46 | 80 | 4 | 6 | 10 |
| di-Triethylamine phthalate | 25-30 | None | 8 | 8 | 50 | | | 50 |
| Do | 25-30 | 4 Cu$_2$Cl$_2$ | 8 | 42 | 70 | 8 | 11 | 11 |
| Monotriethylamine phthalate | 25-30 | None | 8 | 6 | 50 | | | 50 |
| Do | 25-30 | 4 Cu$_2$Cl$_2$ | 8 | 36 | 76 | 4 | 10 | 10 |
| Monotriethylamine maleate | 25-30 | None | 8 | Trace | | | | |
| Do | 25-30 | 4 Cu$_2$Cl$_2$ | 8 | 58 | 46 | 17 | 28 | 9 |
| Monotriethylamine tartarate | 70 | None | 8 | 50 | 15 | 30 | 45 | 10 |
| Do | 70 | 4 Cu$_2$Cl$_2$ | 8 | 53 | 36 | 15 | 35 | 14 |
| 1 mole triethylamine plus 2 moles fumaric acid | 25-30 | None | 8 | Trace | | | | |
| Do | 25-30 | 4 Cu$_2$Cl$_2$ | 8 | 54 | 73 | 9 | 13 | 6 |

EXAMPLE 22

The following experiments were carried out to show that in the presence of cuprous compounds the chloride ion acceptor may be any compound that is capable of reacting with chloride ions and which removes them from the ionic system.

One hundred (100) gram portions of beta pinene pyrolysate hydrochloride, prepared as shown in Example 16, acetic acid and 0.72 mole of chloride ion acceptor were reacted with and without cuprous chloride present. The reaction products were saponified and the saponified oils analyzed by infrared spectroanalysis and vapor phase chromatography. The reactants used, reaction conditions and analysis of the products are shown in the following table.

*Table VI*

| Percent acid based | Chloride ion acceptor | Temp., °C. | Percent catalyst based on hydrochloride | Reaction time, hours | Percent ester | Composition of alcohols from saponified ester | | | |
|---|---|---|---|---|---|---|---|---|---|
| | | | | | | Percent linalool | Percent nerol | Percent geraniol | Percent terpineol |
| 100% acetic acid | None | 25–30 | 4 $Cu_2Cl_2$ | 8 | 10 | 5 | 10 | 15 | 70 |
| Do | $Cu_2O$ | 25–30 | 4 $Cu_2Cl_2$ | 8 | 20 | 39 | | 8 | 53 |
| Do | $Na_3PO_4$ | 25–30 | 4 $Cu_2Cl_2$ | 8 | 61 | 61 | 3 | 4 | 8 |
| Do | $AgNO_3$ | 25–30 | 4 $Cu_2Cl_2$ | 8 | [2] 29 | 7 | | 13 | 80 |
| Do | Propylene oxide | 25–30 | 4 $Cu_2Cl_2$ | 8 | 17 | 32 | | 30 | 38 |
| 200% acetic acid | None | 25–30 | 8 $Cu_2Cl_2$ | 8 | 21 | 8 | 7 | 13 | 72 |
| 100% acetic acid | Anion exchange resin [1] | 25–30 | None | 8 | 27 | 35 | | 25 | 40 |
| Do | do [1] | 25–30 | 4 $Cu_2Cl_2$ | 8 | 50 | 59 | 6 | 13 | 22 |

[1] Permutit deacidite, dry weight used equal to 200% of the hydrochloride weight.
[2] Organic nitro compounds formed during the reaction.

EXAMPLE 23

A terpene fraction (boiling range 170–190° C., a mixture of menthadienes including α-terpinene, gamma terpinene, terpinolene, limonene and 2,4(8)-p-methadiene) was chlorinated at 25–30° C. in the presence of 1.25 moles of sodium bicarbonate. The chlorination product (a mixture of $C_{10}H_{15}Cl$ isomers) was then filtered to remove inorganic salts. One hundred and seventy-two (172) grams of the filtered chlorination product, one hundred and seventy-two (172) grams of acetic acid and 102 grams of sodium acetate and 7 grams of cuprous chloride were stirred at 25–30° C. for 8 hours. The reaction mixture was then washed with water followed by a sodium carbonate wash to yield 174 grams of crude ester. Analysis of the crude ester indicated that it was 37% secondary allylic acetates. The above reaction was repeated without cuprous chloride present. The crude ester obtained contained 15% allylic acetates.

EXAMPLE 24

Dihydromyrcene (2,6-dimethyl-2,6-octadiene) was chlorinated at 25–30° C. in the presence of 1.25 moles of sodium bicarbonate. The chlorination product was filtered to remove inorganic salts. One hundred and seventy-four (174) grams of the filtered chlorination product, 174 grams of acetic acid, 102 grams of anhydrous sodium acetate and 7 grams of cuprous chloride were stirred at 25–30° C. for 8 hours. The reaction mixture was then washed with water followed by a sodium carbonate wash to yield 175 grams of crude ester. Analysis of the crude ester indicated that it contained 36% 2,6-dimethyl-1,6-octadienyl-(3)-acetate. When the above reaction was repeated without cuprous chloride present, the reaction product contained less than 2% ester.

EXAMPLE 25

Alpha pyronene (90+%) was chlorinated at 25–30° C. in the presence of 1.25 moles of sodium bicarbonate. The chlorination product was filtered to remove inorganic salts. One hundred and seventy-two (172) grams of the filtered chlorination product, 172 grams of acetic acid, 102 grams of anhydrous sodium acetate and 7 grams of cuprous chloride were stirred at 25–30° C. for eight hours. The reaction mixture was then washed with water and sodium bicarbonate solution to yield 176 grams of crude ester. Analysis of the crude ester indicated that it was 48% allylic acetate. When the above reaction was repeated without using cuprous chloride, the crude ester obtained contained only 9% allylic acetate.

EXAMPLE 26

Beta pyronene (92+%) was chlorinated at 25–30° C. in the presence of 1.25 moles of sodium bicarbonate. The chlorination mixture was filtered to remove inorganic salts. One hundred and seventy-two (172) grams of the filtered chlorination product, 172 grams of acetic acid, 102 grams of anhydrous sodium acetate and 7 grams of cuprous chloride were stirred at 25–30° C. for 8 hours. The reaction mixture was washed with water followed by a sodium carbonate wash to yield 174 grams of crude ester. Analysis of the crude ester indicated that it contained 40% allylic acetate. When the above reaction was repeated without cuprous chloride present, the crude ester obtained was 11% allylic acetate.

EXAMPLE 27

Alloocimene (97+%) was chlorinated at 20–25° C. in the presence of 1.5 moles of sodium bicarbonate. The chlorination product was filtered to remove inorganic salts. Infrared spectroanalysis of the chlorination product indicated that it was 3-chloro-2,6-dimethyl-1,4,6-octatriene. One hundred and seventy-two (172) grams of the filtered chlorination product, 172 grams of acetic acid, 102 grams of anhydrous sodium acetate and 7 grams of cuprous chloride were stirred at 25–30° C. for 8 hours. The reaction mixture was then washed with water followed by a sodium bicarbonate wash to yield 174 grams of crude ester. Analysis of the crude ester indicated that it was 45–50% 2,6-dimethyl-1,4,6-octatrienyl-3-acetate and 10–15% other allylic acetates. When the above reaction was repeated without cuprous chloride present, the reaction product contained 15% allylic acetates.

EXAMPLE 28

Alpha terpineol (96+%) was chlorinated at 35–40° C. in the presence of 1.25 moles of sodium bicarbonate. The chlorination mixture was filtered to remove inorganic salts. Infrared spectroanalysis of the chlorination product indicated that it was 85–90% 6-chloro-8-hydroxy-1-menthene. One hundred and ninety (190) grams of the chlorination product, 190 grams of acetic acid, 102 grams of anhydrous sodium acetate and 8 grams of cuprous chloride were stirred at 25–30° C. for eight hours. The reaction mixture was washed with water followed by a sodium carbonate wash to yield 192 grams of crude ester. Analysis of the crude ester showed that it was 63–65% 8-hydroxy-1-menthenyl-6-acetate which was readily saponified to sobrerol. When the above reaction was repeated without cuprous chloride present, the crude ester obtained contained 15% 8-hydroxy-1-menthenyl-6-acetate.

EXAMPLE 29

Beta pinene pyrolysate (75% myrcene) containing 0.5% by weight cuprous chloride was chlorinated at 20–25° C. The chlorination product was filtered and washed to remove cuprous chloride. Infrared spectroanalysis of the chlorination product showed that it was 55–60% 3,8-dichloro-2,6-dimethyl-1,6-octadiene. The chlorine thus attacks the 3-position and the hydrogen chloride formed adds to the conjugate system of myrcene. Two hundred and six (206) grams of the washed chlorination product, 206 grams of acetic acid, 205 grams of anhydrous sodium acetate and 8 grams of cuprous chloride were stirred at 25–30° C. for eight hours. The reaction mixture was then washed with water followed by a sodium carbonate wash to yield 211 grams of crude ester. Analysis of the crude ester indicated that it contained 40–45% 2,6-dimethyl-1,7-octadienyl-3,6-diacetate and 5–10% 2,6-dimethyl-1,6-octadienyl-3,8-diacetate. When the above reaction was repeated without cuprous chloride present, the crude ester obtained contained 10% diacetates.

EXAMPLE 30

Four hundred and eight (408) gram portions of alpha pyronene and beta pyronene were each reacted with 110 grams of anhydrous HCl at 15–25° C. Infrared spectroanalysis of the hydrochlorination products showed that alpha and beta pyronene gave the same hydrochlorination product. Dehydrochlorination of the hydrochlorination products by refluxing with 50% KOH in methanol gave 1,1,2-trimethyl-3-methylene-4-cyclohexene containing a small amount of alpha and beta pyronene. From the above data, it is evident that the hydrochlorination products were predominately 3-chloro-1,1,2,3,-tetramethyl-4-cyclohexene. One hundred and seventy-four (174) grams of the above hydrochlorination product, 102 grams of anhydrous sodium acetate, 174 grams of acetic acid and 7 grams of cuprous chloride were stirred at 25–30° C. for 8 hours. The reaction mixture was then washed with water followed by a sodium bicarbonate wash to yield 176 grams of crude ester (57% ester). Infrared spectroanalysis obtained by saponifying the crude ester indicated that it was predominately a secondary alcohol as shown by the intensity of the characteristic secondary alcohol absorption at about 9.8μ. The alcohol is probably 5-hydroxy-1,1,2,3-tetramethyl-3-cyclohexene. When the above reaction was carried out with no cuprous chloride present, the crude washed ester obtained contained 20% ester.

EXAMPLE 31

One hundred and seventy-four (174) grams of 5-chloropara menthene-3 (prepared as shown in Example 6), 300 grams of 1-hydronopic acid, 130 grams of triethyl amine and 7 grams of cuprous chloride were stirred at 25–30° C. for 8 hours. The reaction product was washed with water followed by a sodium carbonate wash to yield 237 grams of crude ester. Analysis of the crude ester indicated that it contained 65% 3-menthenyl-5,1-hydronopate (81% trans and 18% cis). When the above reaction was repeated without cuprous chloride, the reaction product obtained contained 21% ester.

EXAMPLE 32

One hundred and seventy-four (174) grams of 5-chloroparamenthene-3 (prepared as shown in Example 6), 400 grams of 1-menthoxy acetic acid, 126 grams of triethylamine and 7 grams of cuprous chloride were stirred at 25–30° C. for 8 hours. The reaction mixture was washed with water followed by a sodium carbonate wash to yield 223 grams of crude ester. Infrared spectroanalysis of the product obtained by saponifying the crude ester with 50% KOH in methanol showed that the saponification product was 35% 3-para-menthene-5-ol. When the above reaction was repeated without cuprous chloride, the oil obtained on saponification contained 6% 3-para-menthene-5-ol.

EXAMPLE 33

An ocimene rich fraction (75% ocimene, 15% myrcene and 10% limonene) was reacted with anhydrous HCl at 0.10° C. in the presence of 0.5% cuprous chloride based on the ocimene rich fraction. Thirty-six (36) grams of anhydrous HCl was used for each 136 grams of ocimene rich fraction. The resulting hydrochloride was filtered and washed to remove cuprous chloride. One hundred grams of the above washed hydrochlorination product, 100 grams of acetic acid, 60 grams of anhydrous sodium acetate and 4 grams of cuprous chloride were stirred at 25–30° C. for 8 hours. The reaction mixture was then washed with water followed by a sodium carbonate wash to yield 107 grams of crude ester. Analysis of the crude ester showed that it contained 56% allylic acetates (a mixture of linalyl acetate, geranyl acetate, neryl acetate and other allylic acetates. When the above reaction was repeated without the cuprous chloride catalyst, the crude ester obtained contained 9% allylic acetates.

EXAMPLE 34

One hundred (100) grams of beta pinene pyrolysate hydrochloride prepared as shown in Example 16, 4 grams cuprous chloride, 100 grams of acetic acid and 60 grams of anhydrous sodium acetate were stirred at 90–95° C. Samples were taken periodically and washed with water and sodium bicarbonate wash and the crude ester was then analyzed. Five minutes stirring at 90–95° C. gave a crude ester which contained 47% linalyl acetate, 5% alpha terpinyl acetate, 3% neryl acetate, and 8% geranyl acetate. Fifteen minutes at 90–95° C. gave a crude ester which contained 20% linalyl acetate, 11% alpha terpinyl acetate, 6% neryl acetate and 13% geranyl acetate.

EXAMPLE 35

One hundred (100) grams of beta pinene pyrolysate hydrochloride prepared as shown in Example 16, was stirred with 100 grams of acetic acid and 4 grams cuprous chloride at 25–30° C. Small samples were taken at 30 minute intervals. The samples were immediately washed with water followed by a sodium carbonate wash to give a crude ester. Analysis of these crude ester samples showed that after 2 hours the ester content remained constant at 10–12%. Fifteen (15) grams of anhydrous sodium acetate was then added and the reaction mixture was stirred at 25–30° C. with sampling at 30 minute intervals. Analysis of the resulting crude ester samples showed that 1 hour after the addition of the sodium acetate, the ester content of the samples remained constant at 23–25%.

An additional 15 grams of sodium acetate was then added, the reaction mixture stirred and sampled as before. The analysis of these samples showed that after 1.5 hours, the ester content of the samples remained constant at 35–37%. Sampling periodically after the addition of a third 15 gram portion of sodium acetate showed that after two hours the ester content of the samples remained constant at 45–48%. Three hours stirring after the addition of a fourth 15 gram portion of anhydrous sodium acetate gave a crude ester containing 57% ester. The addition of more sodium acetate and allowing additional reaction time did not increase the ester content. The final crude ester obtained contained 45% linalyl acetate, 6% alpha terpinyl acetate, 2% neryl acetate, and 4% geranyl acetate. From the above data, it is evident that the chloride ion produced when the ester is formed is in equilibrium with the ester and acetic acid. Therefore, the removal of the chloride ion by the addition of anhydrous sodium acetate forces the reaction toward the ester.

EXAMPLE 36

One mole of beta-pinene pyrolysate hydrochloride was prepared by adding one mole of HCl gas to 136 grams of β-pinene pyroylsate (75% myrcene) over a period of 16 minutes at 5°–15° C. in the presence of 0.1% cuprous chloride. The resulting myrcene hydrochloride was then added to 154.0 grams of solid ammonium acetate and 2.0 grams of cuprous chloride at 98°–102° over a period of 30 minutes. The mixture was stirred for an additional hour at 98°–102°. The mixture was then cooled and drowned in water. Seventy-three percent (73%) of chlorides was found to have been displaced. The following yield of products was identified by vapor phase chromatography; 44.2% linalyl acetate, 6.6% terpinyl acetate and 24.7% geranyl plus neryl acetates based on weight of starting myrcene in the β-pinene pyrolysate.

EXAMPLE 37

One mole of beta-pinene pyrolysate hydrochloride (173 grams) was prepared as in Example 36 over a period of twenty minutes. The resulting beta-pinene pyrolysate hydrochloride, 4 minutes after preparation, was added dropwise to 96.0 grams of ammonium acetate in 225.0 grams of glacial acetic acid containing 2.0 grams of cuprous chloride. The addition was conducted over a 16 minute period at 78°–80° C. The mixture was then heated an additional 30 minutes at 78°–79° C. The mixture was drowned in water and the aqueous phase removed. Eighty percent (80%) of the chlorides were found to have been displaced. The oil phase when examined by vapor phase chromatography showed: 81.9% linalyl acetate, and minor amounts of terpinyl acetate and geranyl plus neryl acetates based on weight of starting myrcene in the β-pinene pyrolysate.

EXAMPLE 38

One mole of beta-pinene pyrolysate hydrochloride (173 grams) prepared as in Example 36 was added to each of two separate displacement mixtures containing 96.0 grams of ammonium acetate and 225.0 grams of glacial acetic acid. In one reaction 2.0 grams of cuprous chloride was added before the addition. In the other, for comparison, the catalyst was omitted. The reaction mixtures were stirred at 26°–37° for 30 minutes whereupon they were drowned in water and the crude product recovered and analyzed. The results of the reaction analysis are shown in the table below:

Table VII

| Reaction No. | Cuprous chloride | Yield [1] of linalyl acetate and geranyl plus neryl acetate |
| --- | --- | --- |
| 1 | None | 14.0% linalyl acetate, 2.8% geranyl (neryl) acetate. |
| 2 | 2.0 grams | 65.7% linalyl acetate, 6.1% geranyl (neryl) acetate. |

[1] The yields are based on weight of starting myrcene in the β-pinene pyrolysate.

The use of solid or molten ammonium salts of lower fatty acids in the above reactions is especially applicable to ammonium salts of $C_1$ to $C_4$ fatty acids since the melting point of these compounds is below the temperature where dehydrohalogenation may become critical.

The above examples offered as illustrations of the process of my invention adequately demonstrate the range and equivalents of reaction ingredients, reaction conditions and related variables.

Thus, in one aspect of the prior art, specifically as illustrated by the patent to Bell et al., 2,794,826, there is taught that good yields of linalyl acetate can only be obtained by the employment of a solvent system containing less than 4% of an acid based on the solvent used and corresponding to that of the acid salt employed so that the reaction is preferably carried out in a substantially non-acid medium. Other critical features are taught by the Bell et al. patent such as temperature limitations and the use of potassium acetate as the preferred acid salt in the reaction. Contrary to these teachings, however, I have found that an acid solvent, specifically in the reaction of myrcene hydrohalides, and a temperature, preferably below 100° C. has consistently yielded higher quantities of linalyl acetate than heretofore expected. Thus, Example 10 illustrates a reaction wherein substantially no acid was present. Yet, as shown in that example, by the addition of a large amount of acid the yield of linalyl acetate was doubled thereby showing the beneficial effect of the acid.

I have also illustrated (Example 19) that various metal salts of a carboxylic acid may be used as halide ion acceptor if the metal halide formed during the reaction is precipitated from the reaction mixture. If a metal salt such as a calcium, lithium, magnesium or aluminum salt is used an organic soluble metal halide will result. In cases where an organic soluble metal halide is produced, it may be necessary to add a solvent such as benzene, acetone, etc., to decrease the solubility of the resulting organic soluble metal halide and force the reaction toward the formation of ester. I have also illustrated (see Example 21) that salts of various carboxylic acids may be used as halide ion acceptors. If the carboxylic acid salt has a very low solubility in the reaction mixture (such as the metal salts of dicarboxylic acids) the reaction may be carried out by using a more soluble salt such as the amine salts of the dicarboxylic acids.

Having thus described my invention, I hereby claim:

1. An improved process for converting an allylic terpene halide to an ester in which the halogen is selected from the class consisting of chlorine and bromine, which consists essentially in treating said terpene halide with a carboxylic acid salt in the presence of a cuprous halide and a base capable of neutralizing hydrogen halide at a temperature below 100° C., said treatment being carried out in solution in a solvent providing carboxylate ions, for a time sufficient to bring about a substantial production of allylic terpene ester.

2. The process of claim 1 in which the cuprous halide is formed in situ.

3. The process of claim 1 in which the solvent is a carboxylic acid and the basic compound is the carboxylic acid salt.

4. The process of claim 1 in which the salt and basic compound are the same and is a salt of the formula $NH_4X$ in which X is the acyloxy radical of a carboxylic acid containing not more than four carbon atoms and the reaction is carried out above the melting point of said salt.

5. The process of claim 1 in which the terpene halide is a myrcene hydrochloride.

6. The process of claim 5 in which the carboxylic acid salt and the basic compound are the same and the solvent is a carboxylic acid.

7. The process of claim 5 in which the carboxylic acid salt is a salt of the formula $NH_4X$ wherein X is the acyloxy radical of a carboxylic acid containing not more than 4 carbon atoms and the reaction is carried out at a temperature above the melting point of the salt.

8. The process of claim 5 in which the reaction is carried out at ambient temperatures.

9. The process of claim 5 in which the salt is a sodium salt and the solvent is a carboxylic acid.

10. The process of claim 5 in which the salt is an ammonium salt and the temperature and the salt are such that the salt is molten.

11. The process of producing terpene allylic esters which comprises reacting a cyclic terpene allylic chloride with a carboxylic acid salt capable of neutralizing hydrogen halide in the presence of a cuprous halide, said reaction being carried out in solution in a solvent providing carboxylate ions.

12. The process of claim 11 in which the cyclic terpene chloride is a dicyclic compound.

13. The process of claim 11 in which the cyclic terpene chloride is a monocyclic compound.

14. The process of claim 13 in which the cyclic terpene chloride is a p-menthane derivative.

15. The process of claim 13 in which the cyclic terpene chloride is a derivative of 1,1,2,3-teteramethylcyclohexane.

16. The process for producing allylic esters of acyclic terpenes which comprises reacting an acyclic allylic terpene chloride, other than a myrcene hydrohalide selected from the group consisting of linalyl halide, geranyl halide and neryl halide, with a carboxylic acid salt capable of neutralizing hydrogen halide in the presence of a cuprous halide, said reaction being carried out in solution in a solvent providing carboxylate ions.

17. The process of claim 16 in which the solvent is a carboxylic acid.

18. The process of claim 1 in which terpene halide is a bromide.

19. The process of producing an allylic ester by treatment of myrcene hydrobromide with a carboxylic acid salt capable of neutralizing hydrogen halide in a solvent, the improvement which consists essentially in carrying out the reaction in the presence of a cuprous halide at a temperature below 100° C. in a solvent providing carboxylate ions.

20. The process of claim 19 in which the reaction is carried out at ambient temperatures.

21. The process of claim 19 in which the salt is a sodium salt and the solvent is a carboxylic acid.

References Cited in the file of this patent

UNITED STATES PATENTS

| 2,794,826 | Bell et al. | June 4, 1957 |
| 2,868,845 | Webb | Jan. 13, 1959 |

FOREIGN PATENTS

| 10,999 | Great Britain | June 6, 1906 |

OTHER REFERENCES

Roberts et al.: J. Am. Chem. Soc. 64, 2157–2164 (1942).

De Wolfe et al.: Chem. Rev. 56, 833–846 (1956).